United States Patent
Barrere, Jr.

[15] 3,685,256
[45] Aug. 22, 1972

[54] ADSORPTION PROCESS FOR RECOVERING DESIRED COMPONENTS FROM A GAS STREAM

[72] Inventor: Clem A. Barrere, Jr., 2660 Marilee Lane, Apt. A-34, Houston, Tex. 77027

[22] Filed: March 8, 1971

[21] Appl. No.: 121,760

[52] U.S. Cl. .................................. 55/62, 55/74
[51] Int. Cl. .................................. B01d 53/04
[58] Field of Search ........... 55/58, 62, 74, 75, 179

[56] References Cited

UNITED STATES PATENTS 3,435,591   4/1969   Spencer et al. .............. 55/62

Primary Examiner—Charles N. Hart
Attorney—Joseph C. Kotarski, Henry H. Huth, Robert B. Coleman, Jr. and Gerald L. Floyd

[57] ABSTRACT

The present invention relates to an improved adsorption process for recovering desired components from a gas stream, and more particularly, to an adsorption process for recovering desired components from a gas stream wherein one or more of the desired components is difficult to regenerate as compared to the other of the components. By the present invention, a controlled quantity of the difficult-to-regenerate component or components are continuously combined with the heated regeneration gas stream used to regenerate a solid adsorbent containing both difficult and easy to regenerate components so that the rate at which the difficult-to-regenerate component or components are desorbed from the bed is increased.

7 Claims, 2 Drawing Figures

INVENTOR
CLEM A. BARRERE JR.

BY Gerald L. Floyd
ATTORNEY

ADSORPTION PROCESS FOR RECOVERING DESIRED COMPONENTS FROM A GAS STREAM

BACKGROUND OF THE INVENTION

1. Field of the Invention

The present invention relates to an improved adsorption process for recovering desired components from a gas stream, and more particularly, but not by way of limitation, to a cyclic adsorption process wherein a bed of solid adsorbent is contacted with an inlet gas stream so that desired components are adsorbed on the bed, then contacted by a heated regeneration gas stream so that the components are desorbed from the bed and then contacted with a cooling gas stream preparatory to again being contacted with the inlet gas stream.

2. Description of the Prior Art

Many various vapor adsorption processes have been developed of the type wherein one or more beds are utilized for adsorbing desired components from a gas stream while the other beds are being regenerated. In these processes, regeneration of the bed or beds which are saturated with desired components is accomplished by heating the bed or beds with a heated regeneration gas stream thereby causing the desired components to be desorbed from the bed. The hot bed which has been regenerated is then cooled by contacting it with a cooling gas stream preparatory to again being contacted with the inlet gas stream. The various gas streams are continuously switched or cycled so that the bed or beds which have just contacted the inlet gas stream are contacted with the heated regeneration gas stream, the bed or beds which have just been contacted with the heated regeneration gas stream are contacted with the cooling gas stream, and the bed or beds which have just been contacted with the cooling gas stream are contacted with the inlet gas stream.

A variety of solid adsorbent materials are commercially available for selectively adsorbing desired components from gas streams. For example, solid adsorbents such as activated carbon, activated alumina and silica gel are commonly used to adsorb hydrocarbon compounds and/or water from natural gas streams.

Commonly, vapor adsorption processes of the type described above are utilized for adsorbing two or more desired components from a multi-component gas stream. Quite often, one or more of the desired components are difficult to regenerate as compared to the other components. For example, natural gas usually contains hydrocarbon compounds which are relatively easy to regenerate, such as ethane, propane and butane, and hydrocarbon compounds which are relatively difficult to regenerate, such as pentanes and heavier hydrocarbon compounds. Heretofore, the heated regeneration gas stream utilized for regenerating the bed or beds saturated with such desired components has been maintained in as lean a condition as possible, i.e., the regeneration gas stream is caused to contain little or none of the desired components being desorbed from the bed. The prior art arrangements have been predicated on the basis that a lean regeneration gas is highly desirable since it provides a high potential for desorption. While a lean regeneration gas stream effectively brings about the rapid desorption of adsorbed easy-to-regenerate components, a relatively long time and/or high regeneration gas stream rate is required to bring about the desorption of difficult-to-regenerate components.

By the present invention, the heated regeneration gas stream used to regenerate a bed of solid adsorbent containing adsorbed difficult-to-regenerate components as well as easy-to-regenerate components is caused to contain a controlled quantity of the difficult-to-regenerate components thereby bringing about the surprising result of increasing the rate at which the difficult-to-regenerate components are desorbed from the bed, and reducing the size and cost of apparatus required to carry out the process.

SUMMARY OF THE INVENTION

The present invention relates to an improved adsorption process for recovering desired components from an inlet gas stream, one or more of said components being difficult to regenerate as compared to other of said components, wherein a bed of solid adsorbent is contacted with the inlet gas stream so that the desired components are adsorbed thereon, then regenerated by contact with a heated regeneration gas stream so that the components are desorbed from the bed and then contacted with a cooling gas stream so that the bed is cooled preparatory to again being contacted with the inlet gas stream. By the present invention, a predetermined quantity of the difficult-to-regenerate component or components are continuously combined with the regeneration gas stream so that the bed is contacted during the regeneration thereof with a heated regeneration gas stream having a controlled difficult-to-regenerate component content thereby increasing the rate at which the difficult-to-regenerate component or components are desorbed from the bed.

It is, therefore, an object of the present invention to provide an improved vapor adsorption process.

A further object of the present invention is the provision of a vapor adsorption process for recovering desired components from an inlet gas stream wherein the rate at which adsorbed difficult-to-regenerate components are desorbed from an adsorbent bed is increased as compared to conventional adsorption processes.

Other and further objects, features and advantages of the present invention will be apparent from the following description of the presently preferred embodiments of the invention, given for the purpose of disclosure and taken in conjunction with the accompanying drawings.

DESCRIPTION OF THE PREFERRED EMBODIMENTS

The present invention is based on the discovery that the regeneration of a bed of solid adsorbent material having components adsorbed thereon, some of which are difficult to regenerate and some of which are easy to regenerate, behaves in the same manner as a conventional chromatograph. That is, when a lean regeneration gas stream is used to desorb the adsorbed components, the desorption behaves in a manner similar to the desorption of a multi-component sample which has been injected into a chromatograph column. Assuming that components A, B, C and D are adsorbed on a bed of adsorbent, with component A being difficult to regenerate as compared to components B, C and D and the regeneration gas contains little or none of components A, B, C and D, component A is initially located near the entrance of the bed and after a period of time sufficient to cause the easy-to-regenerate components B, C and D to be substantially desorbed and removed, component A will have moved only a small distance through the bed. Thus, a substantial regeneration time and/or a high regeneration gas circulation rate is required to bring about the desorption of the difficult-to-regenerate component A over and above that required to bring about the desorption of the easy-to-regenerate components B, C and D. However, it has been found that if the regeneration gas stream contains a predetermined quantity of component A, the rate of desorption of the component A is substantially increased.

By the present invention, as will be described more fully herein, the rate of desorption of a difficult-to-regenerate component from a bed of adsorbent is increased by combining a predetermined quantity of the difficult component with the regeneration gas stream.

Figure 1:
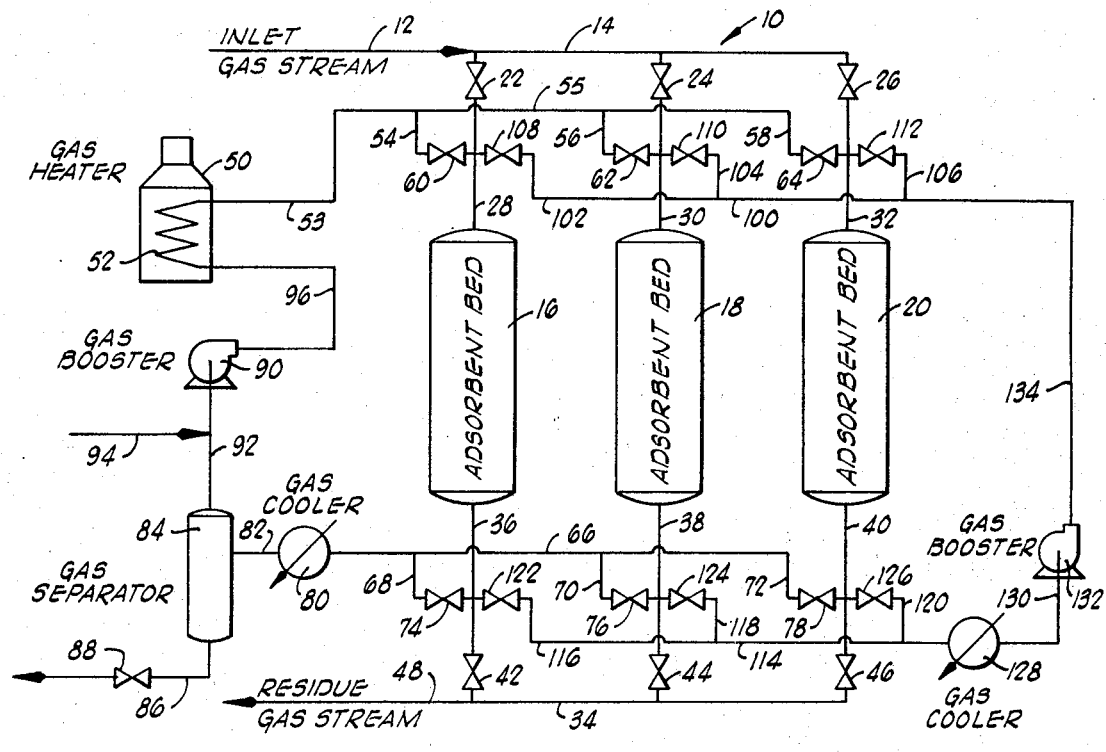
FIG. 1 illustrates one system which may be used for carrying out the improved process of the present invention in diagrammatic form.

Referring specifically to FIG. 1, one system which may be utilized for carrying out the improved process of the present invention is illustrated in diagrammatic form and generally designated by the numeral 10. An inlet gas stream containing desired components to be recovered enters the system 10 by way of a conduit 12. The conduit 12 is connected to an inlet gas header 14 from where the inlet gas stream is routed to one of three vessels 16, 18 and 20, each of which contains a stationary bed of solid adsorbent material. Conduits 28, 30 and 32 are connected to inlet connections of the vessels 16, 18 and 20 respectively, and to the inlet gas stream header 14. Valves 22, 24 and 26 are disposed in the conduits 28, 30 and 32 respectively. A residue gas outlet header 34 is provided connected to outlet connections of the vessels 16, 18 and 20 by conduits 36, 38 and 40 respectively. Valves 42, 44 and 46 are disposed in conduits 36, 38 and 40. The main residue gas header 34 is connected to a conduit 48 which conducts the residue gas from the system 10 to a point of use or further processing.

A closed regeneration gas stream circuit for continuously regenerating one of the adsorbent beds contained within the vessels 16, 18 and 20 is provided. A conventional gas stream heater 50 is provided in the regeneration gas stream circuit having a heating coil 52 disposed therein. A regeneration gas stream inlet header 55 is connected to the outlet connection of the heating coil 52 by a conduit 53, and the header 55 is connected by conduits 54, 56 and 58 to conduits 28, 30 and 32 respectively. Valves 60, 62 and 64 are disposed in the conduits 54, 56 and 58 respectively. A regeneration gas stream outlet header 66 is provided for receiving the regeneration gas stream from the vessels 16, 18 and 20. Conduits 68, 70 and 72 are connected to the header 66 and to the conduits 36, 38 and 40. Valves 74, 76 and 78 are disposed in the conduits 68, 70 and 72 respectively. The header 66 is connected to the inlet of a conventional gas stream cooler 80, and the outlet of the cooler 80 is connected to a conduit 82 which is in turn connected to a conventional gas liquid separator 84. Liquids condensed in the gas cooler 80 accumulate in the separator 84 and are removed therefrom by way of a conduit 86 having a conventional liquid level control valve 88 disposed therein. The gas outlet connection of the separator 84 is connected to a conventional gas booster or compressor 90 by a conduit 92. A conduit 94 is connected to the conduit 92 for combining predetermined quantities of difficult-to-regenerate components with the regeneration gas stream passing through the conduit 92. The discharge of the compressor 90 is connected to the inlet of the heating coil 52 of the heater 50 by a conduit 96.

A closed cooling gas stream circuit is provided comprised of a cooling gas stream inlet header 100 which is connected to the vessels 16, 18 and 20 by way of conduits 102, 104 and 106. The conduits 102, 104 and 106 are connected to the conduits 28, 30 and 32 and to the header 100. The valves 108, 110 and 112 are disposed in the conduits 102, 104 and 106 respectively. A cooling gas stream outlet header 114 is provided for receiving the cooling gas stream from the vessels 16, 18 and 20. The header 114 is connected by conduits 116, 118 and 120 to the conduits 36, 38 and 40 respectively. Valves 122, 124 and 126 are disposed in the conduits 116, 118 and 120. The header 114 is connected to the inlet of a conventional gas cooler 128, and the discharge connection of the cooler 128 is connected by a conduit 130 to a conventional gas booster or compressor 132. The discharge of the compressor 132 is connected to the cooling gas stream inlet header 100 by a conduit 134.

The various valves described above may be any of a variety of pneumatically, hydraulically or electrically operated control valves either two-way or three-way, or combinations of check valves as well as two-way or three-way valves may be used. The sequential opening and closing of the valves is automatically controlled by a controller which may be any of a variety of conventional cycle controllers, either time or temperature actuated. The cycle controller functions to open certain of the valves and close others at the beginning of each cycle so that the flow patterns of the main gas, regeneration gas and cooling gas streams are successively changed in a predetermined manner which will be described further hereinbelow.

The regeneration and cooling gas stream circuits illustrated in FIG. 1 are of the closed type. The term "closed" when referring to these circuits is used herein to mean systems of conduits, gas boosters, valves, etc., wherein gas streams are continuously circulated without the continuous addition or removal of gas. As will be understood, other types of regeneration and cooling gas stream circuits known in the art as "open" circuits may be utilized wherein gas is continuously added to and removed from the circuits. Further, where closed circuits of the type illustrated and described above are used, apparatus and controls (not shown) are provided for maintaining the gas volume circulated at a relatively constant level.

The regeneration gas stream circuit illustrated in FIG. 1 includes a gas cooler 80 and liquid separator 84 for condensing and separating desired components removed from the inlet gas stream. If the components removed from the inlet gas stream are of the non-condensible type, other means well known to those skilled in the art may be employed for separating and recovering the desired components from the regeneration gas stream.

The difficult-to-regenerate component or components continuously added to the regeneration gas stream by way of conduit 94 may be obtained from any convenient source. In the system illustrated in FIG. 1, the liquified desired components separated and withdrawn from the system 10 by way of conduit 86 may be used as a source of the difficult-to-regenerate components. For example, the liquid stream from the separator 84 may be passed by way of the conduit 86 to a conventional fractionation column wherein the difficult-to-regenerate components are separated from other components contained therein, and a measured quantity or portion of the separated difficult-to-regenerate components recycled to the system 10 by way of conduit 94.

While three vessels containing beds of solid adsorbent material have been described, it will be understood that a variety of systems may be utilized for carrying out the improved process of the present invention, which systems may include any number of adsorbent beds, either open or closed regeneration gas and cooling gas stream circuits, etc.

OPERATION OF THE SYSTEM 10

An inlet gas stream containing both difficult-to-regenerate desired components and easy-to-regenerate desired components flows into the system 10 by way of conduit 12 and into one of the vessels 16, 18 or 20. Let it be assumed that the adsorbent bed contained within the vessel 16 is adsorbing desired components from the inlet gas stream. The inlet gas stream flows by way of valve 22 and conduit 28 into the vessel 16. Valves 24 and 26 and conduits 30 and 32 serve a similar purpose when the adsorbent beds within the vessels 18 and 20 are contacted with the inlet gas stream. In passing through the vessel 16, the inlet gas stream contacts the solid adsorbent bed contained therein so that desired components, both difficult and easy to regenerate, are adsorbed on the bed and removed from the gas stream. The resultant residue gas stream exiting from the vessel 16, which is substantially free of desired components, passes through the conduit 36 and valve 42 into the header 34. Valves 44 and 46 and conduits 38 and 40 serve similarly in subsequent cycles. From the header 34 the residue gas stream is removed from the system 10 by way of conduit 48.

When the bed of adsorbent material within the vessel 16 becomes substantially loaded with desired components, it is regenerated by passing through it a heated regeneration gas stream. Let is be assumed that the bed of adsorbent material within the vessel 18 is in the process of being regenerated. A heated regeneration gas stream, having a predetermined difficult-to-regenerate component content, as will be described further herein, passes from the regeneration gas stream inlet header 55 into the vessel 18 by way of conduit 56, valve 62 and conduit 30. Conduits 54, 28, 58 and 32, and valves 60 and 64 serve similarly when the beds of adsorbent in the vessels 16 and 20 are being regenerated. The heated regeneration gas stream flowing through the adsorbent bed contained within the vessel 18 heats the adsorbent material and causes desired components previously adsorbed thereon to be desorbed into the regeneration gas stream. The regeneration gas stream containing the desorbed components flows from the vessel 18 by way of conduit 38, conduit 70 and valve 76 into the regeneration gas stream outlet header 66. Conduits 36, 68, 40 and 72 and valves 74 and 78 serve similarly during subsequent cycles. From the header 66, the regeneration gas stream passes into the gas cooler 80 wherein it is cooled to a temperature level such that most or all of the desorbed desired components contained therein are condensed. The regeneration gas stream and condensed components then pass through conduit 82 into liquid separator 84 wherein the liquid components are separated and removed by way of conduit 86. The lean regeneration gas stream remaining exits the liquid separator 84 and passes by way of conduit 92 into the compressor 90. A predetermined rate of the difficult-to-regenerate component or components being desorbed from the adsorbent in the vessel 18 is passed through conduit 94 into the conduit 92 where it is combined with the lean regeneration gas stream passing therethrough. As previously described, the source of the difficult-to-regenerate component may be any convenient source, or it may be a portion of the difficult-to-regenerate components recovered in the system 10 after separation from the easy-to-regenerate components. The particular quantity or rate of the difficult-to-regenerate component or components combined with the lean regeneration gas stream which will be discussed further hereinbelow depends upon various factors such as the particular components adsorbed, the type of adsorbent material used, and the equilibrium adsorption of the components on the adsorbent material.

The compressor 90 functions to boost the regeneration gas stream, i.e., raise the pressure thereof, so that it is circulated through the regeneration gas stream circuit. From the compressor 90 the combined regeneration gas stream passes by way of conduit 96 into the heating coil 52 of the heater 50. While within the heating coil 52 the regeneration gas stream is heated to a desired temperature level, and the heated regeneration gas stream passes by way of conduit 53 back to the regeneration gas stream inlet header 55.

When an adsorbent bed has been heated and the previously adsorbed desired components desorbed therefrom, it must be cooled before it can again contact the inlet gas stream. Let it be assumed that the bed of adsorbent material within the vessel 20 is in the process of being cooled. The cooling gas stream is passed from the cooling gas stream inlet header 100 into the vessel 20 by way of conduit 106, valve 112 and conduit 32. Conduits 102, 28, 104 and 30, and valves 108 and 110 serve similarly during subsequent cycles. The adsorbent bed contained within the vessel 20 is contacted by the cooling gas stream passing therethrough thereby causing the bed to be cooled. From the vessel 20 the cooling gas stream is passed into the cooling gas stream outlet header 114 by way of conduit 40, conduit 120 and valve 126. Conduits 36, 116, 38 and 118, and valves 122 and 124 serve similar purposes. From header 114, the cooling gas stream passes into the gas cooler 128 wherein heat removed from the adsorbent bed contained within the vessel 20 by the cooling gas stream is removed from the cooling gas stream. From the gas cooler 128 the cooling gas stream is passed by way of conduit 130 to the booster or compressor 132. The compressor 132 functions to boost the pressure of the cooling gas stream so that it passes by way of conduit 134 back to the cooling gas stream inlet header 100.

In order to facilitate a clear understanding of the system 10 by which the improved process of the present invention may be carried out, the adsorbent bed and valve sequence of the system 10 through three complete cycles are presented in Table I below.

TABLE I

Adsorbent Bed and Valve Sequence for System 10

|  | First Cycle | Second Cycle | Third Cycle |
|---|---|---|---|
| Adsorbent bed vessel |  |  |  |
| 16 | Adsorbing | Heating | Cooling |
| 18 | Heating | Cooling | Adsorbing |
| 20 | Cooling | Adsorbing | Heating |
| Valves |  |  |  |
| 22 | Open | Closed | Closed |
| 24 | Closed | Closed | Open |
| 26 | Closed | Open | Closed |
| 42 | Open | Closed | Closed |
| 44 | Closed | Closed | Open |
| 46 | Closed | Open | Closed |
| 60 | Closed | Open | Closed |
| 62 | Open | Closed | Closed |
| 64 | Closed | Closed | Open |
| 74 | Closed | Open | Closed |
| 76 | Open | Closed | Closed |
| 78 | Closed | Closed | Open |
| 108 | Closed | Closed | Open |
| 110 | Closed | Open | Closed |
| 112 | Open | Closed | Closed |
| 122 | Closed | Closed | Open |
| 124 | Closed | Open | Closed |
| 126 | Open | Closed | Closed |

The following example is given to illustrate how the particular quantity of the difficult-to-regenerate component or components combined with the regeneration gas stream is determined.

EXAMPLE 1

The velocity at which a particular component advances through a bed of adsorbent material can be determined from the following equation, which equation is commonly used for determining the velocity of a chromatographic peak:

$$V_A = \frac{V_F}{1 + \left(\frac{(1-y_A)}{n_G}\right)\left(\frac{dn_A}{dn_A}\right)\bigg|_{y_A}}$$

where:

$V_A$ = velocity of component A (ft/min)
$V_F$ = carrier gas velocity (ft/min)
$y_A$ = mol fraction of component A in carrier gas
$n_G$ = mols of carrier gas per unit weight of adsorbent (mols/100 lb adsorbent)

Figure 2:
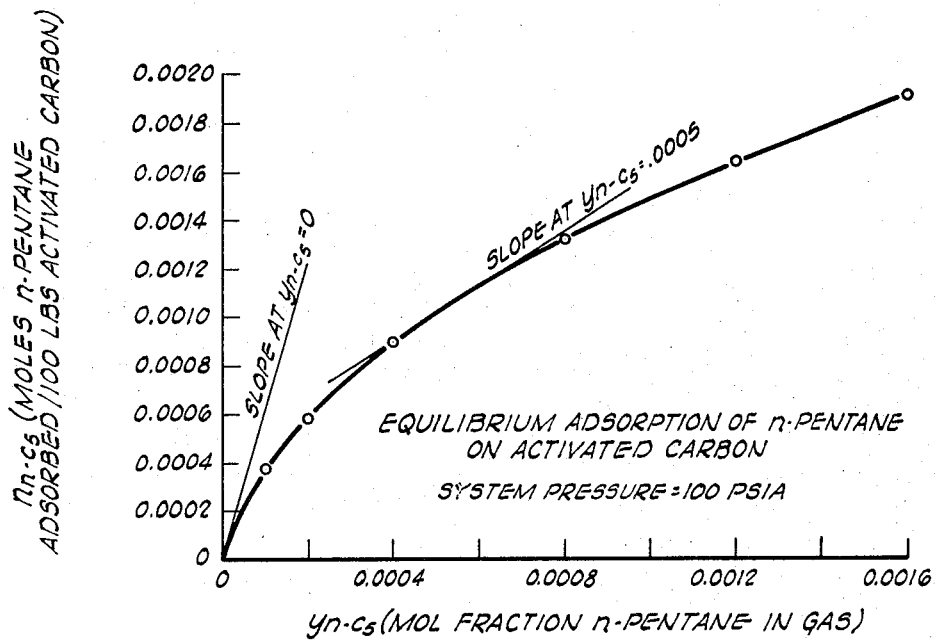
FIG. 2 is a curve illustrating the equilibrium adsorption of n-pentane on activated carbon adsorbent at 100 psia.

$\frac{dn_A}{dn_A}\bigg|_{y_A}$ = slope of equilibrium adsorption curve for component A at the value $y_A$ Referring to FIG. 2, the equilibrium loading of n-pentane on activated carbon at 100 psia is shown. Let it be assumed that n-pentane adsorbed on 100 lbs of activated carbon is to be regenerated at a pressure of 100 psia using a regeneration gas stream (or carrier gas) at a temperature of 600° F and a gas velocity of 10 feet per minute. The mols of regeneration gas per 100 lbs of activated carbon may be calculated by using the Ideal Gas Law as follows:

$$n_G = \frac{PV}{RT} = \frac{(100 \text{ p.s.i.a.})(2.56 \text{ ft.}^3)}{(10.71)(1060° \text{ R.})}$$

$$= 0.025 \text{ mols of regeneration gas}/100 \text{ lb. carbon}$$

Assuming that the regeneration gas stream contains no n-pentane, then from FIG. 2 the slope of the equilibrium curve when this condition exists ($y_n - c_5 = 0$) is as follows:

$$\frac{dn_{n-c_5}}{dy_{n-c_5}}\bigg|_{y_{n-c_5}=0} = \frac{.0012}{.0002} = 6$$

Using the equation given above and solving for the velocity of n-pentane through the bed of activated carbon adsorbent:

$$V_{n-c_5} = \frac{10 \text{ ft./min.}}{1 + \left(\frac{1-0}{0.025}\right)(6)} = 0.0415 \text{ ft./min.}$$

Thus, the n-pentane will advance through the bed of activated carbon at a rate of 0.0415 ft/min in a conventional regeneration process where the regeneration gas contains no n-pentane.

Let it be assumed that, in accordance with the present invention, the regeneration gas stream has a n-pentane content of 0.05 mol percent. The slope of the equilibrium curve shown in FIG. 2 at this condition ($y_n - c_5 = 0.0005$) is 1.13. The velocity of the n-pentane under these conditions is calculated as follows:

$$V_{n-c_5} = \frac{10}{1 + \left(\frac{1-0.0005}{0.25}\right)(1.13)} = 0.217 \text{ ft./min.}$$

Thus, for a regeneration gas velocity of 10 ft/min, the velocity of the n-pentane advancing through the bed by the process of the present invention is 0.217 ft/min. as compared to 0.0415 ft/min. for a conventional process. Consequently, the time required for regenerating an adsorbent bed containing difficult-to-regenerate components is reduced by the present invention by a factor of 5.22. This, in turn, represents a substantial decrease in the size of apparatus required for carrying out the process of the present invention.

As will be understood by those skilled in the art, the optimum regeneration gas stream difficult-to-regenerate component content may be determined for a particular application of the process of the present invention using equilibrium data and the equation described above in conjunction with known engineering sizing and costing techniques.

The following example serves to further illustrate the improved process of the present invention.

EXAMPLE 2

A 20 mmscf/day natural gas stream of the composition given in Table II below and at inlet conditions of 500 psia and 100° F is processed by the system 10 shown in FIG. 2 with the desired components being propane through normal hexane hydrocarbon compounds contained therein. The normal hexane compounds contained in the inlet gas stream are difficult to regenerate as compared to the propane through normal pentane compounds.

TABLE II

Composition of Inlet Gas Stream

| Component | Concentration (Mol %) |
|---|---|
| Methane | 89.3 |
| Ethane | 6.0 |
| Propane | 3.0 |
| Isobutane | 0.7 |
| n-butane | 0.5 |
| Isopentane | 0.2 |
| n-pentane | 0.2 |
| n-hexane | 0.1 |
| Total: | 100.0 |

15,000 pounds of activated carbon adsorbent material are contained in each of the vessels 16, 18 and 20, and a cycle time of 20 minutes is used.

During a first cycle as shown in Table I the inlet gas stream contacts the adsorbent bed contained within the vessel 16, and an 18.5 mmscf/day residue gas stream is produced which is withdrawn from the system 10 by way of the conduit 48 at an average temperature of 120° F.

Simultaneously, the adsorbent bed contained within the vessel 18 is contacted with a 30 mmscf/day regeneration gas stream having a normal hexane hydrocarbon compound content of 0.05 mol percent. The regeneration gas stream is at an inlet temperature of 550° F, and exits from the vessel 18 at an initial temperature of 120° F, reaching a maximum temperature of 500° F. The regeneration gas stream is cooled to a temperature of 90° F as it passes through the cooler 80 resulting in 45,000 gallons/day of condensed hydrocarbon compounds which are removed from the separator 84. The remaining regeneration gas stream exits the separator 84 at the rate of 30 mmscf/day and is of the composition given in Table III below.

TABLE III

Composition of Regeneration Gas Stream Exiting Separator 84

| Component | Concentration (Mol %) |
|---|---|
| Methane | 32.77 |
| Ethane | 42.69 |
| Propane | 20.66 |
| Isobutane | 2.26 |
| n-butane | 1.18 |
| Isopentane | 0.24 |
| n-pentane | 0.19 |
| n-hexane | 0.01 |
| Total: | 100.00 |

A 0.012 mmscf/day stream of normal hexane (equivalent to 475 gallons/day) is passed by way of the conduit 94 into the conduit 92 wherein it combines with the regeneration gas stream passing therethrough resulting in a combined regeneration gas stream of the composition given in Table IV below:

TABLE IV

Composition of Combined Regeneration Gas Stream

| Component | Concentration (Mol %) |
|---|---|
| Methane | 32.76 |
| Ethane | 42.67 |
| Propane | 20.65 |
| Isobutane | 2.26 |
| n-butane | 1.18 |
| Isopentane | 0.24 |
| n-pentane | 0.19 |
| n-hexane | 0.05 |
| Total: | 100.00 |

An 18.5 mmscf/day stream of cooling gas is simultaneously passed into the vessel 20 at a temperature of 90° F. The cooling gas stream initially exiting the vessel 20 is at a temperature of 500° F and reaches a maximum temperature of 525° F. The bed of adsorbent contained within the vessel 20 is cooled to an average temperature of 140° F.

The above is compared with a conventional process wherein the regeneration gas stream contacting the adsorbent within the vessel 18 has the composition given in Table III above.

The regeneration gas stream of Table III at a rate of 30 mmscf/day and the other conditions given above requires a bed contact time of 82 minutes to bring about the desorption of the difficult-to-regenerate normal hexane compounds adsorbed on the adsorbent bed in the vessel 18. Alternatively, a regeneration gas stream rate of 123 mmscf/day is required to desorb the normal hexane compounds from the bed in the cycle time of 20 minutes.

The present invention, therefore, is well adapted to carry out the objects and attain the ends and advantages mentioned as well as those inherent therein. While presently preferred embodiments of the invention are given for the purpose of disclosure, numerous changes can be made which will readily suggest themselves to those skilled in the art and which are encompassed within the spirit of the invention disclosed and claimed herein.

What is claimed is:

1. In a vapor adsorption process for recovering desired components from an inlet gas stream, one or more of said components being difficult to regenerate as compared to other of said components, wherein a bed of solid adsorbent is contacted with said inlet gas stream so that said desired components are adsorbed thereon, then regenerated by contact with a heated regeneration gas stream, and then contacted with a cooling gas stream so that the bed is cooled preparatory to again being contacted with said inlet gas stream, the improvement comprising:

continuously combining a predetermined quantity of said difficult-to-regenerate components with said regeneration gas stream so that said bed is contacted during the regeneration thereof with a heated regeneration gas stream having a controlled difficult-to-regenerate component content, thereby increasing the rate at which said difficult-to-regenerate components are desorbed from said bed.

2. The process of claim 1 wherein the regeneration gas stream is confined within a closed circuit.

3. The process of claim 2 wherein the inlet gas stream is natural gas, the desired components are propane and heavier hydrocarbon compounds contained therein, and the difficult-to-regenerate components are pentanes and heavier hydrocarbon compounds contained therein.

4. The process of claim 3 wherein the adsorbent is activated carbon.

5. A cyclic vapor adsorption process for recovering desired components from an inlet gas stream, one or more of said components being difficult to regenerate as compared to the other of said components, which comprises the steps of:

contacting one or more of a plurality of stationary beds of solid adsorbent with said inlet gas stream so that said desired components are adsorbed thereon;

simultaneously regenerating one or more other of said beds by contact with a heated regeneration gas stream confined within a closed circuit so that desired components are desorbed from said bed into said regeneration gas stream;

removing said desorbed components from said regeneration gas stream;

continuously combining a predetermined quantity of said difficult-to-regenerate components with said regeneration gas stream remaining after said desorbed components have been removed therefrom so that said heated regeneration gas stream is of a controlled difficult-to-regenerate component content thereby increasing the rate at which said difficult-to-regenerate components are desorbed from said bed or beds;

simultaneously contacting yet one or more other of said beds with a cooling gas stream so that said beds are cooled preparatory to being contacted with said inlet gas stream; and cycling said inlet gas, regeneration gas and cooling gas streams so that the bed or beds just contacted with said inlet gas stream are contacted with said regeneration gas stream, the bed or beds just contacted with said regeneration gas stream are contacted with the cooling gas stream and the bed or beds just contacted with the cooling gas stream are contacted with the inlet gas stream.

6. The process of claim 5 wherein the inlet gas stream is natural gas, the desired components are propane and heavier hydrocarbon compounds contained therein, and the difficult-to-regenerate components are pentanes and heavier hydrocarbon compounds contained therein.

7. The process of claim 6 wherein the adsorbent is activated carbon.

* * * * *